United States Patent [19]

Sylva

[11] Patent Number: 4,477,347

[45] Date of Patent: Oct. 16, 1984

[54] PORTABLE WATER PURIFIER

[76] Inventor: Francis W. Sylva, 17 Angie Rd., North Billerica, Mass. 01862

[21] Appl. No.: 506,449

[22] Filed: Jun. 21, 1983

[51] Int. Cl.³ .................. B01D 27/08; C02F 1/28
[52] U.S. Cl. .................. 210/232; 210/258; 210/282; 210/295; 210/416.3; 210/433.2
[58] Field of Search .......... 210/484, 257.2, 295, 210/489, 470, 490, 511, 500.2, 232, 238, 282, 416.3, 416.1, 258, 433; 417/11, 20; 206/217, 218, 508; 141/98

[56] References Cited

U.S. PATENT DOCUMENTS

| | | | |
|---|---|---|---|
| 2,436,077 | 2/1948 | Robertson | 210/416.3 |
| 2,984,190 | 5/1961 | Dibley | 417/511 |
| 3,362,575 | 1/1968 | Fotos | 206/508 |
| 3,522,884 | 8/1970 | Frost | 210/232 |
| 3,529,726 | 9/1970 | Keenan | 210/282 |
| 3,744,639 | 7/1973 | Teeple | 210/282 |
| 3,752,604 | 8/1973 | Dorn | 417/511 |
| 3,764,526 | 10/1973 | King | 210/490 |
| 3,823,824 | 7/1974 | Close | 210/282 |
| 3,849,312 | 11/1974 | Wecker | 210/470 |
| 4,151,092 | 4/1979 | Grimm | 210/282 |
| 4,389,311 | 6/1983 | La Freniere | 210/282 |

Primary Examiner—Ernest Therkorn
Assistant Examiner—John Donofrio
Attorney, Agent, or Firm—William Nitkin

[57] ABSTRACT

A portable water purifier having a filter housing adapted to contain a replaceable filter assembly to which filter housing is releasably attached an unfiltered water chamber with a pressurizing pump located on the top thereof. A cup member is releasably attached to the unfiltered water chamber covering the pressurizing pump and a cap member is releasably attached beneath the filter housing when the portable water purifier is in its storage mode. When the portable water purifier is in its use mode, the cap is removed from the base of the filter housing and attached to the bottom of the cup and the cup is removed from its position covering the pressurizing pump and attached to the filter housing at the position where the cap was attached. Water to be filtered is placed in the unfiltered water chamber when it is disengaged from the filter housing and after reattachment thereto the pressurizing pump is manually operated to create pressure in the unfiltered water chamber forcing the unfiltered water through the filter and into the cup.

3 Claims, 3 Drawing Figures

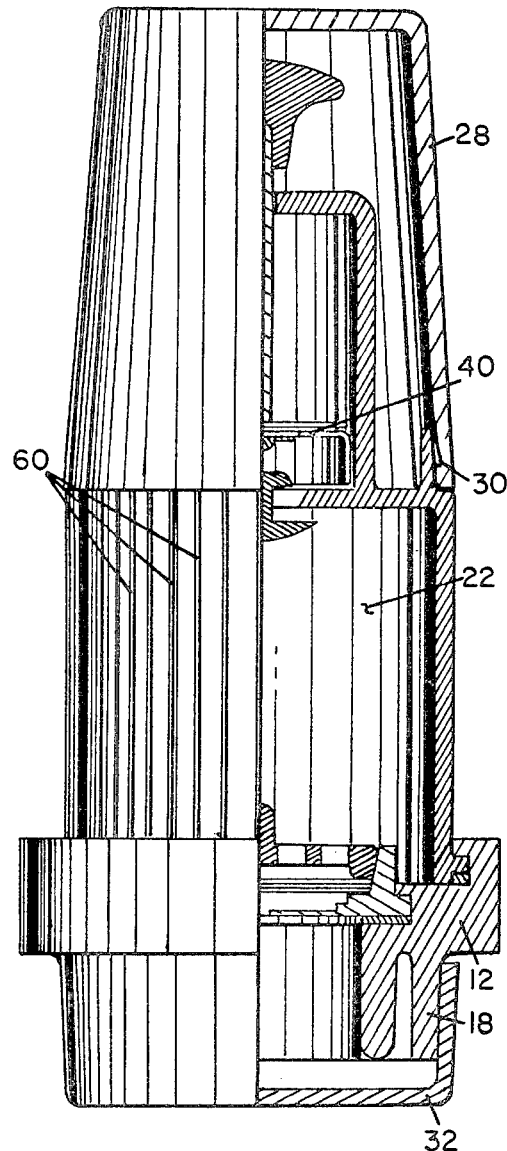
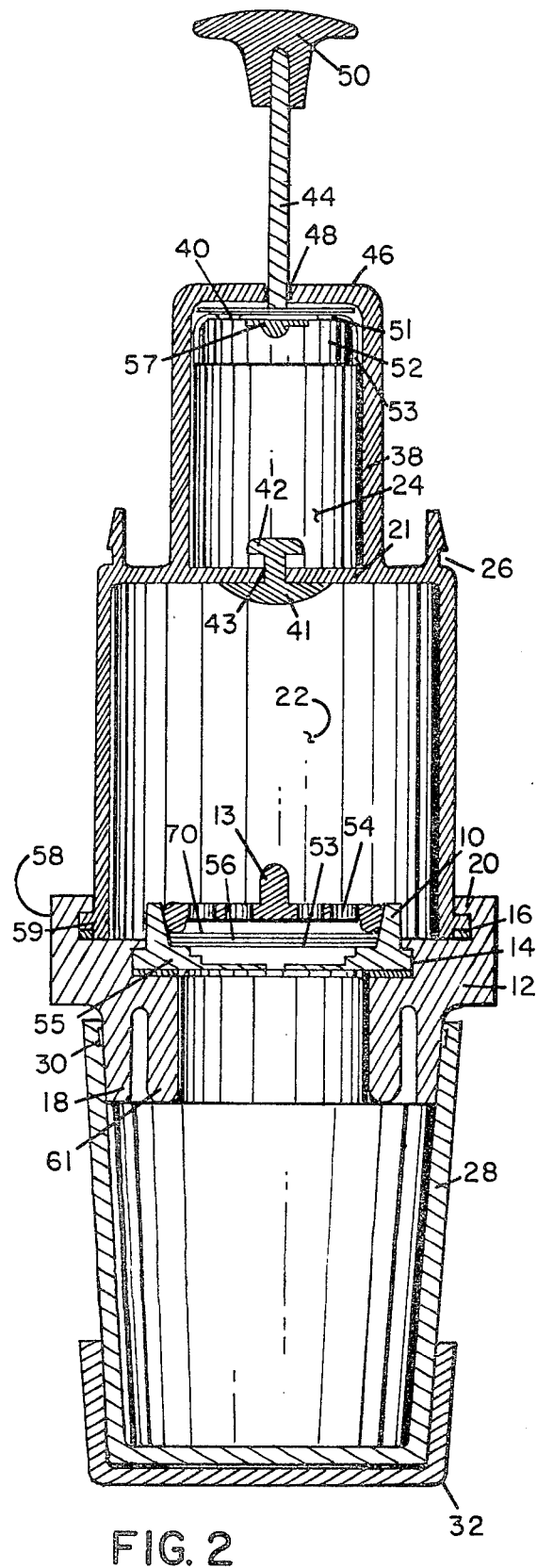
FIG. 1
FIG. 2

PORTABLE WATER PURIFIER

BACKGROUND OF THE INVENTION

1. Field of the Invention

The device of this invention resides in the area of portable water purifiers and more particularly relates to a small self-contained easily carried water-filtering device suitable for use in the field with a replaceable filter element.

2. History of the Prior Art

Individuals, when away from drinkable water supplies, need to purify water such as found in lakes, rivers and streams before drinking it. Early purification methods required the boiling of the water and/or the addition of chemicals before it was fit for consumption. These procedures usually did not adequately purify the water and/or imparted to it a foul taste. Therefore water filtration systems were developed to remove contaminants. These water filtration systems pass unpurified water through a filter to trap any contaminants therein. In the past many filtering mediums have been utilized such as felt or cloth as disclosed in the U.S. Pat. No. 53,606 to Gruber patented in 1866. The art has developed considerably over the years and filters utilizing spun or wrapped fibers in a cylinder shape having water passed radially through the cylinder from the outside to its hollow inside have been developed such as seen in U.S. Pat. No. 4,277,333 to Coppola. Other filtering mechanisms deserve mention such as the use of pleated cylindrically-formed filter paper and combinations utilized therewith along with spun fiber and activated carbon. Activated carbon is an excellent element to use in water filters due to its large surface area and its property of removing large dispersed particles making the filtered water very clear. Plastic mesh has been used as a filter medium and is successful in removing particles as small as 1 micron in size. Osmotic membranes which employ a difference in potential to pass, for example, water containing salt ions therethrough while retaining the ions on the unfiltered side of the membrane and the filtered water being ion free have been utilized to remove salt from sea water but this method usually requires very high pressures and further treatments to the water after filtering.

Small portable water filters have been designed for use by backpackers and the like as mentioned above but it has long been desirable to have an exceedingly small, simple, highly portable water purifier such as disclosed herein.

SUMMARY OF THE INVENTION

It is an object of this invention to provide a portable means for purifying water from any source in order to provide water suitable for drinking. The device of this invention is a completely portable apparatus having an unfiltered water reservoir, pump mechanism, filter and filtered water holding cup in one small compact lightweight unit suitable for carrying in a large pocket, knapsack, dufflebag or even clipped onto a belt. The device not only can be utilized by backpackers and the like but also can be used for military applications because it is light, durable and highly effective at removing dirt and bacteria from any available water source. International travelers will also find the device of this invention useful because it will remove the bacteria in water which may cause intestinal upset or other illness to foreigners in the country in which they are traveling.

It is a further object of this invention to provide a filter assembly of unique construction which is low in cost and hence disposable after use and which also assures the isolation of unfiltered water from the water that has been filtered. The hydrophilic membrane utilized as a part of the filter assembly of this device is capable of removing submicron particles from the water due to its controlled pore size. This filter assembly allows removal of living organisms as small as bacteria without the use of chemicals or expensive germicidal metals. Along with the hydrophilic membrane in the filter disk is an activated carbon impregnated filter which has the equivalent filtering properties of granular activated carbon. The device of this invention further includes means for carrying a filtered-water holding cup in both a storage mode and in a use mode to receive and retain the filtered water. The cup is easily removable from the device for water consumption and when not in use protects the pump element from damage. The device of this invention at the base of the purifier housing can also be attached directly to larger water storage containers so that a larger volume of water may be filtered and stored for later use or in another use the interior of the base of the purifier housing can accept the threads of a canteen which can store the filtered water.

A still further object of this invention is to avoid complicated valve mechanisms with expensive-to-manufacture internal parts such as check valves, springs and bellow structures which exert direct pressure on the fluids being filtered. In contrast, it is yet still a further object of this invention to pressurize an intermediary compressible medium such as air, which medium applies continuous pressure to the fluid being filtered, thereby forcing it through the filter. To accomplish this, a stationary reed-type pump mechanism allowing pressure relief on the upstroke and positive pressure on the downstroke is utilized to pressurize the unfiltered water chamber. The pump is manually operated and no external energy source is needed. Because of the short stroke of the pump, several easy manual strokes are required to build up the necessary pressure within the unfiltered water chamber after which the device can be set to rest while the pressure forces the water through the filter.

The purifier is manufactured from strong durable plastic materials and the filter assembly can be interlocked into a purifier housing. After the device is used and the filter has had the appropriate amount of water passed through it and is exhausted, the unfiltered water chamber can be easily snapped off the purifier housing to gain access to the filter assembly. One can easily grasp the filter handle of the filter assembly, unlock the filter assembly from the purifier housing, and throw it away. A new unused filter assembly can then be easily interlocked into the purifier housing and the unfiltered water chamber reattached to the purifier housing. At the top of the unfiltered water chamber is the pump mechanism which, when the device is not in use, is completely covered and protected by the cup member which fits on and attaches thereover. A cap member is fitted onto the base of the purifier housing forming a completely enclosed solid cylinder which is easily transportable and is extremely difficult to damage in any way.

In use, one would first unlock the unfiltered water chamber from the filter housing and put the water to be filtered therein and reattach it to the filter housing. One would then remove the cap from the bottom of the filter housing, unsnap the cup from the top of the unfiltered water chamber and attach it to the place where the cap was below the filter housing. One would then operate the pump by moving its handle up and down several times to pressurize the unfiltered water chamber thereby forcing water through the filter assembly and through the exit water port in the filter housing into the cup. The cap may be retained in the use mode position on the bottom of the cup.

The filter assembly of this invention utilizes non-chemical mechanical filtration to remove any pollutants in the water. Particles down to 0.22 microns can be easily removed. The filter components are held within a plastic filter assembly having an upper portion on which is formed the filter handle and a lower portion which is interlocked into the filter housing. The filter components are as follows: a pad is first placed in the lower housing to support the membrane, a hydrophilic membrane such as a Millipore microfiltration membrane or equivalent is positioned next, then an activated carbon filter disk is positioned over the membrane to sandwich and seal the membrane from leakage. The membrane is a thin microporous filter medium with a defined pore size and can ensure quantitative retention. Above the membrane is positioned a porous activated carbon disk which acts as a pre-filter to remove large particles as well as several other pathogens and unwanted chemicals. In a second embodiment of the filter design, a single element of spun polypropelene fiber impregnated with activated carbon and cross-linked with epoxy resin is used with a separate activated porous carbon disk and hydrophilic membrane. When the filter becomes clogged with material, it is disposed of and replaced with another filter. It is expected that the filter of this invention will be able to filter up to 1 liter of water before clogging, that replacement filters will be inexpensive, and that a number of them will be easy to carry.

BRIEF DESCRIPTION OF THE DRAWINGS

FIG. 1 illustrates the device of this invention in its storage mode with half cutaway to disclose interior structure.

FIG. 2 is a cross-sectional view of the device of this invention in its use mode.

DESCRIPTION OF THE PREFERRED EMBODIMENT(S)

Figure 3:
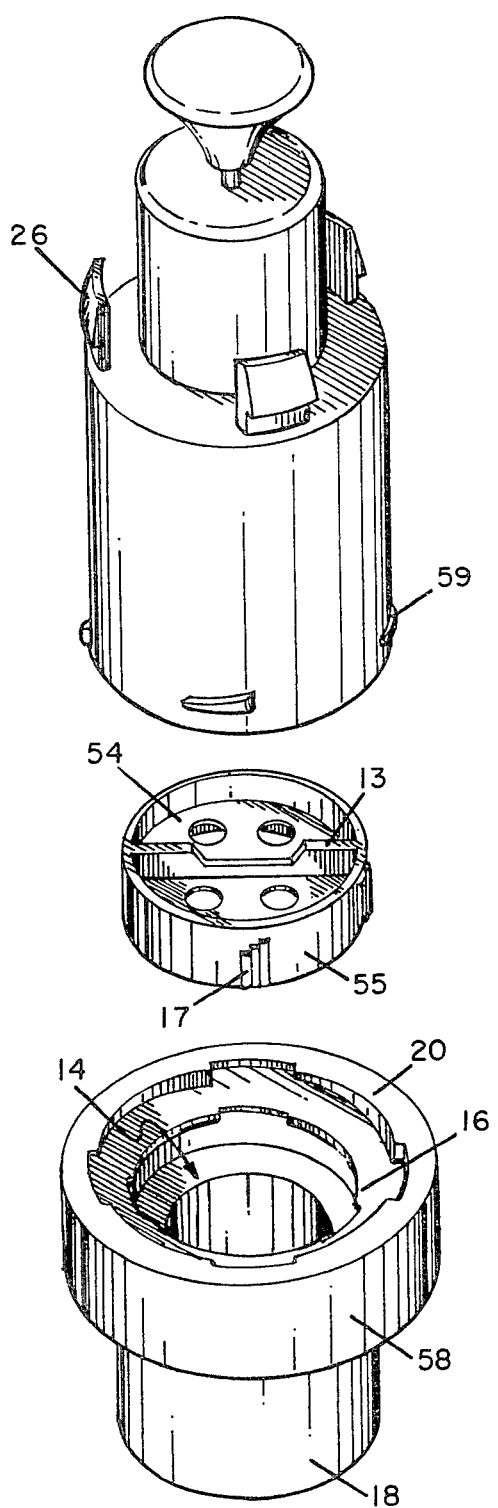
FIG. 3 illustrates a partial exploded view of the device showing the interlock mechanisms.

FIG. 1 illustrates an elevational view of the device of this invention with one half in cross-section. Seen in the left side of FIG. 1 is the exterior of the device of this invention forming a closed cylinder protecting all the interior components and making the device easy to transport and store since the plastic of its manufacture is extremely strong and durable. At the top is cup 28 which extends down to the unfiltered water chamber 22 and is removably affixed thereto. Cylindrical unfiltered water chamber 22 extends downward to the filter housing 12 to which it is removably attached. Filter housing 12 extends outward somewhat from the rest of the unit forming knurl 58 which assists in the easy grasping of the filter housing to unlock therefrom the unfiltered water chamber 22 and cap member 32 which is removably attached at the bottom of the filter housing. Looking at the right side of FIG. 1 the interior structure is seen in cross-section. In this view filter housing 12 and filter assembly 10 as shown interlocked together with the filter assembly's bayonet interlock 16 engaged into the filter assembly's receipt aperture 14 which has a mating bayonet interlock.

Filter handle 13, seen in end view, extends the diameter of filter top 54 and can be used to easily grasp and rotate filter assembly 10 to unlock it from filter housing 12. Around the outside perimeter of its base the filter housing has formed therein a filter housing cup/cap receipt member 18 for the receipt of cap member 32 which fits onto filter housing cup/cap receipt member 18 with friction-fit retention when the device is in its storage mode. When the device is in its use mode, cap member 32 is removed from filter housing 12, and cup 28 is unsnapped from the top of the unfiltered water chamber and replaces cap member 32 by being pushed onto the filter housing cup/cap receipt member 18. Filter housing 12 in its interior base section has a further projecting cylindrical portion namely the external water-receipt element attachment 61 which attaches to external receipt members for water other than cup 28 such as larger volume water containers of canteens. The filter housing includes at its top perimeter a water chamber receipt interlock member 20 into which a mating water chamber projection member 59 extending around the perimeter of the base of unfiltered water chamber 22 interlocks by a bayonet-type attachment so as to removably attach unfiltered water chamber 22 to filter housing 12. Unfiltered water chamber 22 extends upward and at its top is positioned pump 24 which communicates to unfiltered water chamber 22 through aperture 43. Pump 24 includes pump housing 38 with piston 40 adapted to move up and down within the pump housing. Piston 40 is attached to shaft 44 which extends upward through pump housing top 46 and has handle 50 affixed at the end thereof. Piston 40, when in its downward position, lowers the handle so that when cup 28 is positioned over it, its cup retention groove 30 positioned around the inside perimeter of its open end mates and snaps into a cup retention projection 26 formed around the perimeter of the top of the unfiltered water chamber. When cup 28 is removed from the top of the unfiltered water chamber and in most cases is pushed onto the base of the filter housing, one can manually move handle 50 of pump 24 up and down, actuating piston 40 within the pump housing. Pump 24 operates by having a first valve 42 formed in the top of the unfiltered water chamber 22 by valve seal washer 41 which moves within aperture 43 between unfiltered water chamber 22 and pump housing 38. Valve seal washer 41 at its base is wider than aperture 43 and when the piston moves upward, the upward movement of the piston pulls by air pressure valve seal washer 41 against unfiltered water chamber top 21 around aperture 43, thereby sealing the unfiltered water chamber. When the piston is moved downward, valve seal washer 41 moves away from the unfiltered water chamber top 21 and opens aperture 43 between the pump housing 38 and unfiltered water chamber 22. A projection on the upper portion of valve seal washer 41 holds it in position within aperture 43 as the projection extends over unfiltered water chamber top 21 beyond aperture 43. A second valve 52 is located beneath piston 40. This valve is formed of a flexible material such as plastic shaped as an open cylinder with its sides 53 pressing outward against the inside of pump housing 38. Second valve 52 extends beyond piston 40 and is retained in place by washer 57 held to the bottom of shaft 44. Valve aperture 51 is positioned in the top of second valve 52 beneath piston 40 so that when the handle is pulled upwards, the attached piston moves upwards and air can pass between the perimeter of piston 40 and the inside of pump housing 38 while slides 53 of second valve 52 are moved downward slightly so that the top of second valve 52 moves away from piston 40 exposing second valve aperture 51 allowing air to enter into the chamber of the pump housing beneath the piston by traveling around the piston on the upstroke and through second valve aperture 51. While this is happening as mentioned above, first valve seal washer 41 closes against the top of unfiltered water chamber top 21. The functioning of these valves on the upstroke allows air to enter into the pump housing below piston 40. On the downstroke sides 53 of second valve 52 move upward causing the top of second valve 52 to be forced tightly against piston 40, thereby closing valve aperture 51 and air, then trapped below piston 40 within pump housing 38 is forced now by open first valve seal washer 41 through aperture 43 into the unfiltered water chamber 22. By moving the handle up and down, air pressure will build up in unfiltered water chamber 22. This air pressure builds up within the unfiltered water chamber and forces the water placed therein through the filter assembly 10 and into cup 28 or other receipt member attached below.

In FIG. 2 the device is seen in its use mode with cup 28 removed from its storage position at the top of unfiltered water chamber 22 and attached by pushing it in position at the base of the filter housing. Cap member 32, which was removed from the base of filter housing 12 before the cup was attached thereto, can be pushed into position at the base of the cup. In this Figure piston 40 is shown in its upward position ready for a pressurizing stroke.

The casing of the filter assembly is comprised of a plastic filter top member 54, a portion of which is formed into filter handle 13 and which filter top 54 is securely affixed within filter base 55 which is interlocked into filter housing 12 as described above. Sandwiched between filter top member 54 and filter base 55 are activated charcoal disk 70 and membrane 56 as described above. The filtering elements, though, may take other forms as long as they will perform the equivalent function of the membranes and activated carbon as discussed in the Summary. It should be noted that filter top member 54 and filter base 55 contain perforations therein to allow water to pass therethrough and that in some embodiments a polypropelene screen or porous pad 53 will be needed between filter base 55 and membrane 56 to support the membrane.

FIG. 3 illustrates an embodiment showing the interlock mechanisms. Seen in this Figure is the filter housing with filter assembly receipt aperture 14 surrounded by bayonet interlock 16 which has a plurality of slots into which filter projection members 17 engage. Rotation of handle 13 then locks the filter in the filter base. Filter projection members 17 can be a series of ribs as shown, each being longer on one side than the other creating a locking ramp to tighten the filter as it is turned. Rotation in the other direction will unlock the filter so it can be lifted out. Similarly, water chamber projection members 59 can be engaged into water chamber interlock 20 and the unfiltered water chamber 22 rotated to be locked in place. Reverse rotation will unlock the filter chamber for its removal. At the top of the water chamber is cup retention projection 26 which can be formed on a series of upward-extending members as shown.

The entire exterior of the structure including the cup, the unfiltered water chamber, the filter housing and the cap can have a plurality of ribs 60 as seen on the left side of FIG. 1 to make grasping of the purifier easier.

Although the present invention has been described with reference to particular embodiments, it will be apparent to those skilled in the art that variations and modifications can be substituted therefore without departing from the principles and spirit of the invention.

I claim:

1. A portable water purifier comprising:
   a filter housing member with a top and base, having a filter assembly receipt aperture defined therein, said filter having further:
   (a) a knurl portion;
   (b) a water chamber receipt member at its top perimeter;
   (c) a filter housing cup receipt member at its base;
   (d) an external water receipt element attachment at its base within the area of said filter housing cup receipt member;
   a cylindrical unfiltered water chamber member having a top and bottom, said bottom having an open end defined therein adapted at its open bottom to be releasably attached to said filter housing at said water chamber receipt member;
   pump means having a diameter adapted to be smaller than the diameter of said cylindrical unfiltered water chamber, said pump means positioned on the top of said unfiltered water chamber member adapted to pressurize the insides of said unfiltered water chamber, said pump means further including:
   a piston;
   a pump housing adapted to contain said piston for reciprocating motion thereby;
   a shaft member attached to said piston extending to the outside of said pump housing;
   means outside of said pump housing to allow the grasping of said shaft and the reciprocal movement thereof which movement moves said piston up and down within said pump housing;
   a first valve positioned between said pump housing and said unfiltered water chamber, adapted to close the aperture defined therebetween on the upstroke of said pump and to open said aperture on the downstroke of said pump;
   a second valve member adjacent and attached to said piston member adapted to allow air to enter beneath said piston on the upstroke and to close on the downstroke so that a downstroke causes air to enter said unfiltered water chamber while an upstroke scales said unfiltered water chamber so that no air escapes therefrom and which after several pumps of the piston creates an increase of air pressure within said unfiltered water chamber forcing any fluid placed therein through said filter assembly and into said cap member;
   a cylindrical cup member having an open end defined therein of a like diameter of the top of said unfiltered water chamber which cup in a storage mode is releasably retained covering said pump means at the top of said unfiltered water chamber forming a continuous contiguous outer surface with said unfiltered water chamber said cup adapted to cover and protect said pump means and which cup member in a use mode is adapted to be removed from the top of said unfiltered water chamber and positioned at the base of said filter housing releasably attached to said filter housing cup receipt member;

a filter assembly adapted to be retained in said filter assembly receipt aperture adapted for water to pass therethrough from said unfiltered water chamber to said cup member upon pressurization of said unfiltered water chamber by said pump means;

a cap member having an open end defined therein which cap member in said storage mode is releasably attached to said filter housing cup receipt member and which in said use mode is removed from said filter housing to allow said cup member to be attached thereto, which cap member can then be retained by releasably attaching it to the end of said cup member said water chamber receipt member defined in said fitler housing is an interlock member defined around the upper perimeter of said filter housing and said unfiltered water chamber further includes around the outer perimeter of its open end a plurality of water chamber projection members adapted to mate with said water chamber receipt member's interlock member being releasably attachable thereto, said unfiltered water chamber further including at least a segment of the perimeter of its upper portion a cup receipt member projection, said cup member also further including around the inner perimeter of its open end a cup retention groove adapted to mate with and be releasable from said cup receipt member projection;

a filter base having interlock projections around its outside perimeter;

support means located in said filter base;

a hydrophilic membrane positioned over said support means;

an activated carbon disk positioned over said hydrophilic membrane;

a filter top sandwiching said activated carbon disk, membrane, and support member with said filter base, said filter top further including means to grasp game; and said filter assembly further includes means along the sides of said filter assembly receipt aperture adapted to mate with the interlock projections on said filter base to allow said filter assembly to be engaged into said filter assembly receipt aperture in said filter housing.

2. The device of claim 1 wherein said cup member is not utilized to receive said filtered water, said device operating with an alternative water collection means adapted to be attached to said external water receipt element attachment member and to receive said filtered water.

3. The device of claim 1 wherein the exterior surfaces of said cup, said unfiltered water chamber, said filter assembly and said cap are formed with a plurality of ribs.

* * * * *